United States Patent [19]

Johnson

[11] Patent Number: 4,953,426
[45] Date of Patent: Sep. 4, 1990

[54] HOUSING SUPPORT FOR HYDRAULIC DISPLACEMENT UNIT SWASHPLATE

[75] Inventor: Alan W. Johnson, Ames, Iowa

[73] Assignee: Sauer-Sundstrand Company, Ames, Iowa

[21] Appl. No.: 318,731

[22] Filed: Mar. 3, 1989

[51] Int. Cl.⁵ ............................................. F16H 57/02
[52] U.S. Cl. ................................................. 74/606 R
[58] Field of Search ............. 74/655, 687, 730, 606 R; 91/499; 417/269; 60/487

[56] References Cited

U.S. PATENT DOCUMENTS 2,218,405  10/1940  Orshansky, Jr. ..................... 74/687

FOREIGN PATENT DOCUMENTS 0439445  4/1912  France .................................. 60/487

Primary Examiner—Leslie A. Braun
Assistant Examiner—Harold F. Macris
Attorney, Agent, or Firm—Wood, Phillips, Mason, Recktenwald & VanSanten

[57] ABSTRACT

A housing support for a hydraulic displacement unit swashplate wherein the swashplate extends across the split line between a two-part housing for the hydraulic displacement unit. The housing support is provided by a support surface formed on one housing part and which has extensions thereof extending beyond the housing part. These extensions protrude into the other housing part when the two housing parts are assembled together at the abutting split line. These surface extensions are preferably in the form of a pair of fingers which are spaced from each other to straddle a bearing positioned in a bearing cavity formed in the two housing parts. This enables the fingers to be of sufficient structural section to withstand the hydraulic forces imposed on the part of the swashplate supported thereby.

11 Claims, 2 Drawing Sheets

HOUSING SUPPORT FOR HYDRAULIC DISPLACEMENT UNIT SWASHPLATE

TECHNICAL FIELD

This invention pertains to a housing support for a hydraulic displacement unit swashplate wherein the swashplate extends across the split line between a two-part housing for the hydraulic displacement unit. The swashplate is supported against hydraulic forces imposed thereon by structure which minimizes the machining requirements for the housings with corresponding cost reduction. The swashplate must be supported at both sides of the split line between the housing parts and the minimal machining is achieved by having structure associated only with one housing part which provides for support of the swashplate at both sides of the split line.

BACKGROUND ART

Axial piston hydraulic displacement units have a swashplate which, when set at an angle relative to the axis of rotation of a cylinder block movably mounting the axial pistons, reacts the hydraulic forces. In a hydraulic displacement unit having a fixed displacement, the swashplate is at a fixed angle and conventionally is supported by housing structure having a support surface at an angle corresponding to the angle of the swashplate. Typically, the entire support surface is on a single housing member.

The invention disclosed herein relates to the support of the swashplate of a fixed displacement hydraulic displacement unit in a two-part housing having a split line therebetween by structure associated with only one part of the housing. This avoids the necessity of machining operations to form support surfaces in both parts of the housing.

DISCLOSURE OF THE INVENTION

A primary feature of the invention is to provide support structure for the swashplate of a fixed displacement hydraulic displacement unit mounted in a two-part housing, with the swashplate spanning a split line between the housing parts wherein the support is achieved by structure associated solely with one of the housing parts. This places the alignment and tolerance requirements all in one housing part which allows the support surface for the swashplate to be an initial shape of the housing part, as accomplished by casting of the housing part and without added machining to accurately align the two housing parts.

More particularly, one housing part has a support surface at an angle as determined by the desired angle for the fixed angle swashplate, with this support surface extending toward the split line between the housing parts and with a pair of integral fingers extending beyond the split line for positioning within the other housing part and in supporting relation with a portion of the swashplate.

In a particular embodiment of the support structure, the support surface formed on one housing part is located adjacent a bearing cavity in the housing part. The support structure extending into the other housing part comprises a pair of fingers which straddle a bearing mounted in the bearing cavity which allows the fingers to have a sufficiently large enough structural section to support the hydraulic forces transmitted through the swashplate to the support structure.

An object of the invention is to provide in combination a hydraulic displacement unit having a swashplate and a two-part housing therefor, a drive output shaft extending from said one unit, said two-part housing having a split line between housing parts with said drive output shaft centerline being located on said split line, said swashplate extending across said split line, and means on one housing part only providing the only support for the swashplate relative to hydraulic forces imposed thereon including support means integral with said one housing part and which extends across the split line between housing parts.

Still another object of the invention is to provide the combination as set forth in the preceding paragraph wherein the support means comprises a plurality of fingers which extend across the split line.

The support structure for the swashplate of the hydraulic displacement unit disclosed herein is a portion of an integrated hydrostatic transaxle which has a two-part common housing for a hydrostatic transmission and a pair of oppositely-extending differentially connected axles. The hydraulic displacement unit of fixed displacement functions as a motor and has the swashplate at a fixed angle with its support extending across a split line between the two-part housing The integrated hydrostatic transaxle has bearing cavities for wheel axles and a drive output shaft of the hydraulic displacement unit functioning as a motor which are coincident with the split line between the two housing parts. This enables the cavities for the bearings and shaft seals to be cast in the housing parts, rather than machined, with corresponding cost reduction. This desirable result, results in having the swashplate extend across the split line and requiring support of portions thereof which are located within both housing parts. Support of the swashplate by structure associated only with one of the housing parts enables casting of the support structure into the one housing part without requiring the machining which would be necessary if the support structure were associated with both housing parts.

An object of the invention is to provide an integrated hydrostatic transaxle having a two-part common housing for a hydrostatic transmission and a pair of oppositely-extending differentially-connected axles, said hydrostatic transmission comprising a pair of hydraulically interconnected displacement units each having a swashplate with at least one swashplate having a central opening, a drive output shaft extending from one of said displacement units through the swashplate central opening, said drive output shaft and said axles having their rotation axes in a common plane, said two-part housing having a split line between housing parts which is in or closely adjacent to said common plane, said one swashplate extending across said split line, and means on one housing part only for support of the swashplate relative to hydraulic forces imposed thereon including support means integral with said one housing part and which extends across the split line between housing parts.

Still another object of the invention is to provide an integrated hydrostatic transaxle as set forth in the preceding paragraph wherein said support means comprises a plurality of support element which, preferably, are in the form of a pair of fingers and which lie generally in the plane of a bearing cavity and which straddle a bearing whereby the fingers may have sufficient structural suction to withstand forces applied to the swashplate.

DESCRIPTION OF THE PREFERRED EMBODIMENT

Figure 1:
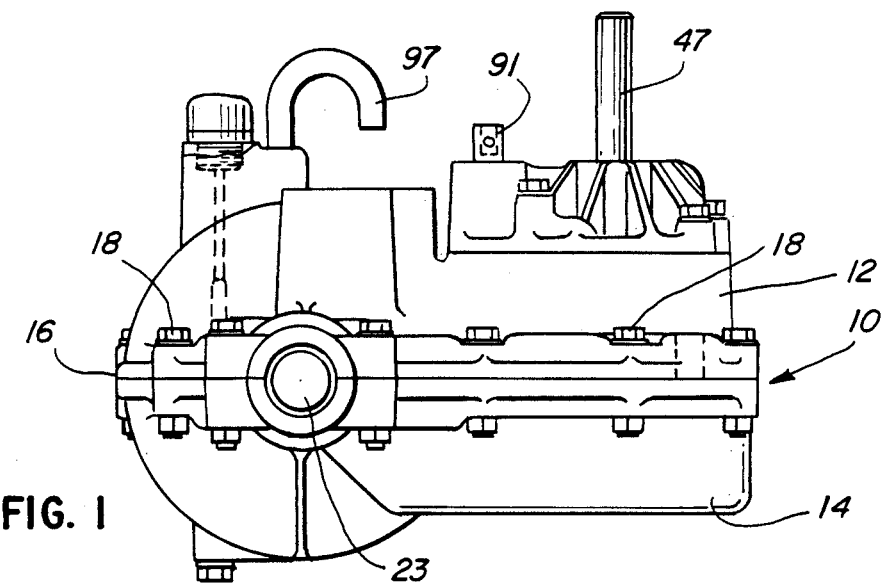
FIG. 1 is a side elevation view of the integrated hydrostatic transaxle, taken looking toward the left in FIG. 2.
Figure 2:
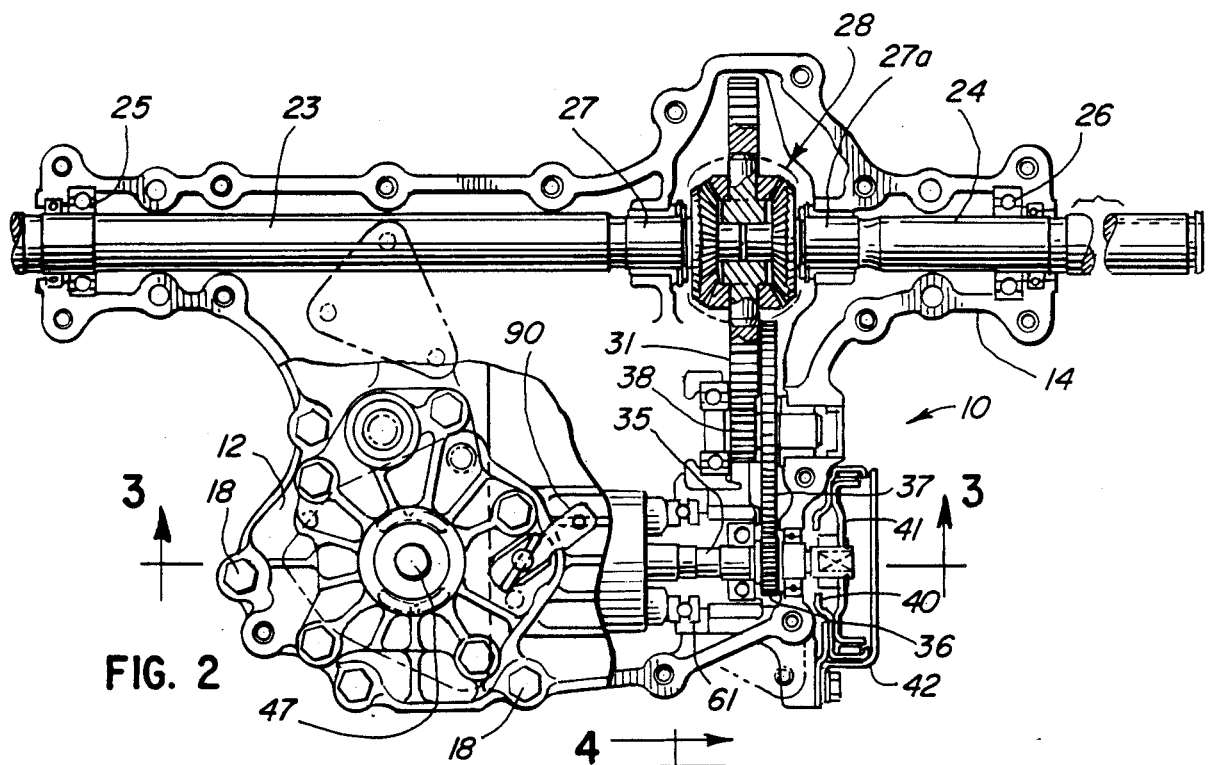
FIG. 2 is a plan view of the integrated hydrostatic transaxle, with parts broken away.
Figure 3:
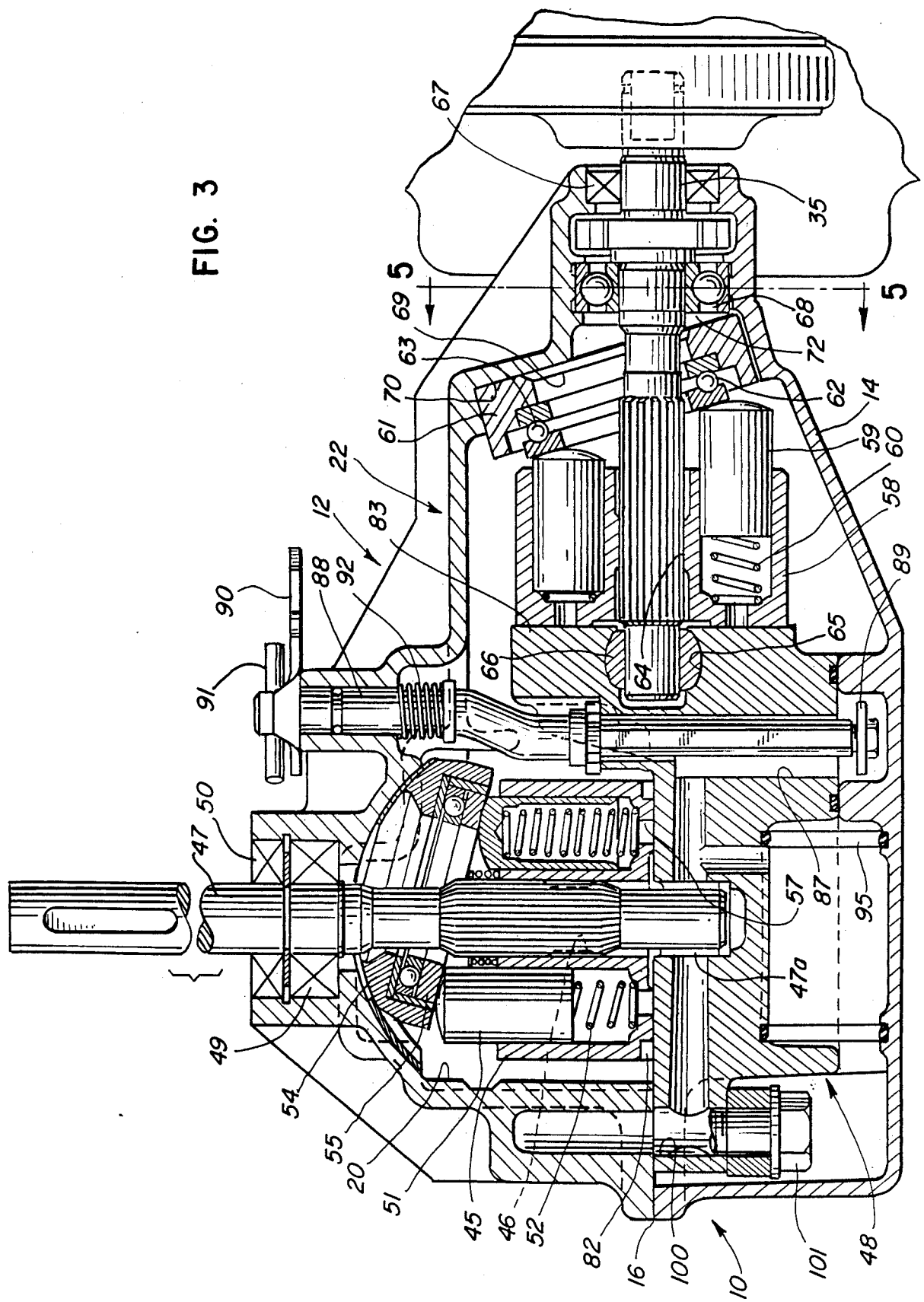
FIG. 3 is a vertical section, taken generally along the line 3—3 in FIG. 2, and on an enlarged scale.

The integrated hydrostatic transaxle is shown generally in FIGS. 1 to 3.

The integrated hydrostatic transaxle has a common housing 10 for the components thereof. The common housing 10 is of two parts, with a top part 12 and a bottom part 14 which are joined together along a split line 16 which is disposed generally horizontal when the integrated hydrostatic transaxle is installed in operative position. The housing parts 12 and 14 are held in assembled relation by a series of bolts 18 extending through peripheral flanges of the top and bottom housing parts which abut at the split line 16.

The shape of the housing parts in plan is shown in FIG. 2 wherein a portion of the top housing part 12 is seen in the lower left part of the Figure and with the remainder thereof broken away to show the bottom housing part 14.

The common housing 10 encloses a hydrostatic transmission having a pair of hydraulic displacement units, indicated generally at 20 and 22, respectively, and also houses transaxle components, seen particularly in FIG. 2. The transaxle components are described in detail in an application of Louis and Johnson, Ser. No. 319,164, filed Mar. 3, 1989. They include a pair of oppositely-extending axles 23 and 24 having ends extended beyond the bottom housing part for mounting of drive wheels (not shown) and their centerlines are coincident with the housing split line 16. Axles have bearings 25 and 26 at their outboard ends and thrust bearings 27 and 27a at the inboard ends for rotatable support thereof and with the axles being geared together through a differential, indicated generally at 28. A gear 31 meshes with a gear 38. The gear reduction drive has a drive input connection from the hydraulic displacement unit 22, with the output shaft 35 (FIG. 3) of the latter having a gear 36 which meshes with a gear 37. The latter gear is rotatably fixed to a gear 38.

A brake for the drive is mounted externally of the common housing 10 and associated with an end of the drive output shaft 35, with this brake structure, including a brake 40, a brake drum 41 and a brake cover 42.

Each of the hydraulic displacement units 20 and 22 is shown in detail in FIG. 3 and is of generally the same construction. The hydraulic displacement unit 20 has a rotatable cylinder block 45 connected by a splined connection 46 to a drive input shaft 47 having an internal end rotatable in a journal 47a positioned in a center section, indicated generally at 48, of the hydrostatic transmission. The outboard end of the drive input shaft 47 is rotatably supported by the top housing part 12 by means of a bearing 49. A lip seal 50 seals the shaft opening in the top housing part 12.

The rotatable cylinder block 45 has a series of piston-receiving chambers, each of which movably mount a piston 51 of a relatively large diameter and with each of the pistons 51 being urged by an associated spring 52 into following engagement with a swashplate structure. The hydraulic displacement unit 20 has overcenter variable displacement, with this operation being achieved by angular adjustment of a swashplate 54 which, as well known in the art, can have its angle varied from the clockwise position shown in FIG. 3 to an opposite extreme position in a known manner and by manually operable structure, not shown. The swashplate can pivot about a pivot axis in a counterclockwise direction and past a horizontal center position, as viewed in FIG. 3. The swashplate 54, as known in the art, mounts a thrust plate 55 against which the pistons abut and a bearing and bearing guide structure rotatably support the thrust plate 55 relative to the body of the swashplate.

Each of the piston-receiving chambers has a passage 57 opening to a face of the rotatable cylinder block 45 for coaction with arcuate ports of the center section 48 which will be described subsequently.

The hydraulic displacement unit 22 is a fixed displacement unit and has a rotatable cylinder block 58 with a plurality of piston-receiving chambers each movably mounting a piston 59 which is spring-urged by a spring 60 toward a swashplate 61. The swashplate 61 has a thrust plate 62 against which an end of the pistons engages and a ball thrust bearing 63 interposed between the thrust plate and the swashplate to rotatably mount the thrust plate.

The rotatable cylinder block 58 drives the drive output shaft 35 through a splined connection 64 therebetween.

An inner end of the drive output shaft 35 rotates within an opening 65 in the center section 48 which has a journal 66. The outboard end of the drive output shaft 35 is sealed by a lip seal 67 and with bearing structure disposed interiorly thereof including a ball bearing 68.

Each of the piston-receiving chambers of the rotatable cylinder block 58 has a passage 69 opening to a face thereof which coact with arcuate ports associated with a face of the center section 48.

Since the hydraulic displacement unit 22 is of a fixed displacement, the swashplate 61 need not be adjustably mounted and, therefore, can be supported by the common housing 10 against hydraulic forces exerted through the pistons 59. As seen in FIG. 3, the centerline of the drive output shaft 35 is located on the split line 16 of the housing parts 12 and 14 and extends through a central opening 69 in the swashplate 61. The swashplate 61 spans the split line and support thereof against fluid forces is provided by the common housing at both sides of the split line.

The support of the swashplate 61 is achieved solely by support structure associated with only one of the housing parts. As stated previously, the primary objective of the integrated hydrostatic transaxle is to have the two-part housing split along a split line which is coincident with the centerline of all of the rotatable shafts. With this including the drive output shaft of the fixed displacement unit 22, it is inherent that the swashplate 61 will span the split line and, therefore, there are parts of the swashplate at both sides of the split line which require support relative to the hydraulic forces of the pistons 59.

If the support is to be by both housing parts, then it would be necessary to take into account alignments and tolerance requirements with respect to association of the two housing parts with resulting machining operations.

Figure 4:
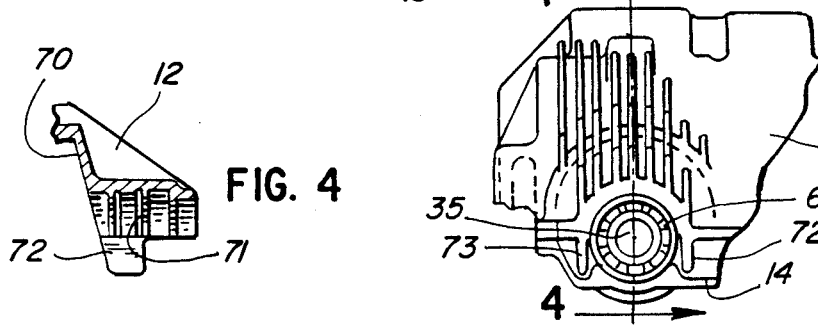
FIG. 4 is a fragmentary section of a portion of the top housing part and taken generally along line 4—4 in FIG. 5.
Figure 5:
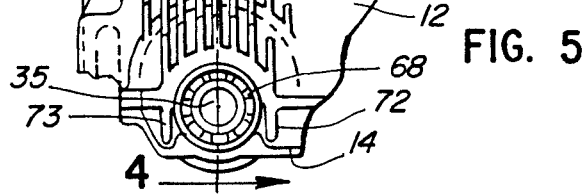
FIG. 5 is a vertical section, taken generally along the line 5—5 in FIG. 3.

These requirements are avoided by the structure disclosed herein wherein the support means is integral with the top housing part 12 (FIG. 4) and includes an inclined planar surface 70 formed on the interior of the top housing part and at an angle equal to the desired angle for the swashplate 61. As seen in FIGS. 3 and 4, the surface 70 is immediately adjacent and above a bearing cavity 71 for housing part of the ball bearing 68. The planar surface 70 continues downwardly to either side of the bearing cavity 71 and the surface terminates in a pair of integral fingers 72 and 73 which extend across the split line 16. The fingers 72 and 73, as seen in FIG. 5, straddle the bearing 68 which allows the fingers to have a sufficiently large section to support the hydraulic forces of the motor pistons on the swashplate 61 without increasing the length of the housing 10.

The hydraulic displacement units 20 and 22 have their respective rotatable cylinder blocks arranged with their axes of rotation generally at right angles to each other. The center section 48 has internal passages, not shown, to provide communication between selected piston-receiving chambers of the respective cylinder blocks 45 and 58. The one-piece center section 48 is generally L-shaped to have a pair of faces generally at right angles to each other with one planar face 82 having arcuate ports (not shown) coacting with a face of the rotatable cylinder block 45 of the variable displacement unit 20 and a second planar face 83 having arcuate ports (not shown) coacting with a face of the rotatable cylinder block 58 of the hydraulic displacement unit 22.

The detailed structure of the center section is disclosed in the aforesaid Louis and Johnson application and the structure thereof is incorporated herein by reference.

The center section 48 has structure associated therewith providing for delivery of make-up fluid to the hydraulic circuit as well as for bypass operation wherein separate flow paths between the displacement units are cross-connected and with this structure being described in detail in the aforesaid Louis and Johnson application. Certain of this structure is seen in the drawings, with the center section having a through bore 87 which mounts a vertically-movable bypass rod 88. The rod, at its lower end, connects to a bypass actuator plate 89 which, when lifted, will cause the opening of a pair of check valves (not shown) movably mounted in the center section 48. This elevating movement of the bypass rod 88 is achieved by rotation of a handle 90 having a pair of upturned cams thereon which coact and engage against the underside of a pin 91 extended through an end of the bypass rod 88 whereby rotation of the handle 90 will cause the cam structure to lift the bypass rod 88 against the action of a spring 92.

The center section has a recess which partially receives a tubular fluid filter 95 whereby there can be flow from a sump in the common housing 10 through the filter for delivery of make-up fluid to the hydraulic circuit. The common sump has an air bleed tube 97 (FIG. 1) open to the atmosphere The center section 48 is positioned between the housing parts and has a series of through mounting holes, one of which is seen at 100, whereby the center section 48 can be secured to the upper housing part 12, as by self-tapping screws one of which is shown at 101, and final assembly achieved by bringing the bottom housing part 14 into association with the top housing part 12 along the split line 16.

I claim:

1. In combination, a hydraulic displacement unit having a swashplate and a two-part housing therefor, a drive output shaft extending from said unit, said two-part housing having a split line between housing parts with said drive output shaft centerline being located in the plane coincident with said split line, said swashplate extending across said split line, and means on one housing part only providing the only support for the swashplate relative to hydraulic forces imposed thereon including means for providing support integral with said one housing part and which extends across the split line between housing parts.

2. The combination as set forth in claim 1 wherein said means for providing support comprises a plurality of fingers which extend across said plane.

3. The combination as set forth in claim 1 wherein the housing parts have seal and bearing cavities, and said means for providing support includes a planar surface on said one housing part which extends above and to either side of the bearing cavity in said one housing part and which terminates in a pair of fingers extending across the plane coincident with the split line.

4. The combination as set forth in claim 1 wherein said swashplate is non-adjustable in operation and has a central opening through which said drive output shaft extends.

5. An integrated hydrostatic transaxle having a two-part common housing for a hydrostatic transmission and a pair of oppositely-extending differentially-connected axles, said hydrostatic transmission comprising a pair of hydraulically interconnected displacement units each having a swashplate with at least one swashplate having a central opening, a drive output shaft extending from one of said displacement units through the swashplate central opening, said drive output shaft and said axles having their rotation axes in a common plane, said two-part housing having a split line between housing parts which is in or closely adjacent to said common plane, said one swashplate extending across a plane containing said split line, and means on one housing part only for support of the swashplate relative to hydraulic forces imposed thereon including means for providing support integral with one housing part and which extends across said plane containing said split line between housing parts.

6. An integrated hydrostatic transaxle as defined in claim 5 wherein said for providing support means comprises a plurality of support elements.

7. An integrated hydrostatic transaxle as defined in claim 6 wherein said support elements are a plurality of fingers.

8. An integrated hydrostatic transaxle as defined in claim 5 and having a bearing and a seal for said drive output shaft, and each housing part having cavities to provide a support mounting for a part of said bearing and seal.

9. An integrated hydrostatic transaxle as set forth in claim 8 and wherein said means for providing support includes a planar surface on said one housing part which extends above and to either side of the cavity for said bearing and which terminates in a pair of fingers extending across said plane containing said split line, said fingers lying generally in the plane of the bearing cavity in the other housing part and positioned at opposite sides thereof to straddle said bearing.

10. A hydraulic displacement unit and a two-part housing therefor comprising, a swashplate for the hydraulic displacement unit and having a central opening, a drive output shaft extending from said displacement unit and through the swashplate central opening, said two-part housing having a split line between housing parts which is in a plane generally coincident with the centerline of the drive output shaft, said swashplate extending across said plane, and means on one housing part only for support of the swashplate relative to hydraulic forces imposed thereon comprising a planar surface on said one housing part and integral fingers which extend across said plane into the other housing part.

11. A combination as set forth in claim 10 wherein said housing parts have sections of a bearing cavity for a drive output shaft bearing, said planar surface generally surrounds the bearing cavity section in said one housing part, and said fingers straddle the bearing cavity section in the other housing part to have a size adequate to withstand forces imposed on said swashplate.

* * * * *